(No Model.)

A. B. CAMERON.
ORNAMENTAL WOOD AND METAL WORK.

No. 473,185. Patented Apr. 19, 1892.

WITNESSES:
Gustave Dieterich
M. Bosch

INVENTOR
Allan B. Cameron
BY Park Benjamin
his ATTORNEY.

UNITED STATES PATENT OFFICE.

ALLAN B. CAMERON, OF WILLIAMSPORT, PENNSYLVANIA.

ORNAMENTAL WOOD AND METAL WORK.

SPECIFICATION forming part of Letters Patent No. 473,185, dated April 19, 1892.

Application filed February 4, 1891. Serial No. 380,140. (No model.)

*To all whom it may concern:*

Be it known that I, ALLAN B. CAMERON, of Williamsport, Lycoming county, Pennsylvania, have invented a new and useful Improvement in Ornamental Wood and Metal Work, of which the following is a specification.

The object of my invention is to produce an ornamental surface of inlaid wood and metal which may be used for the decoration of walls, floors, furniture, &c.

My invention is a new article of manufacture consisting in an open-work grille or lattice of wood having its interstices filled with metal, thus forming a solid slab or panel, as hereinafter more particularly described.

Figure 1:
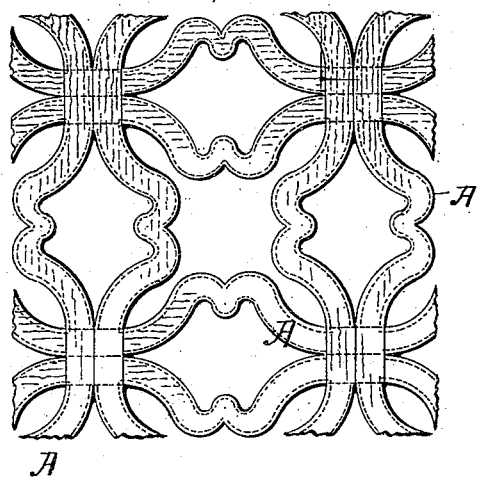
Figure 2:
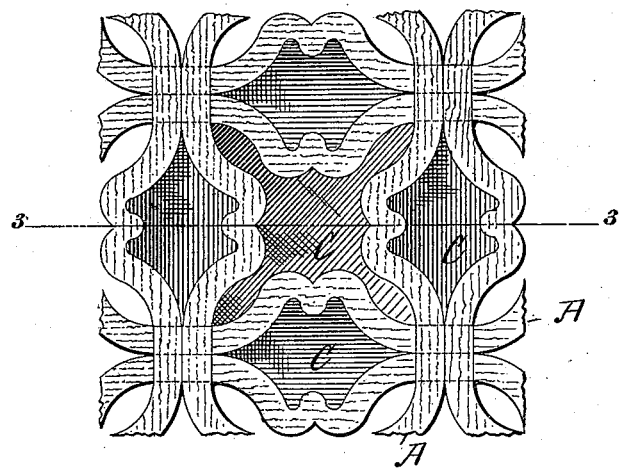
Figure 3:
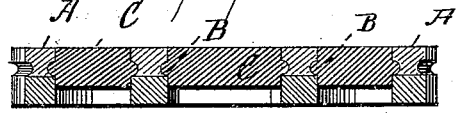

In the accompanying drawings, Figure 1 represents an open-work lattice of wood. Fig. 2 represents said lattice with its openings or interstices filled with metal, and Fig. 3 is a sectional view on the line 3 3 of Fig. 2.

Similar letters of reference indicate like parts.

I produce the open-work grille or lattice shown in Fig. 1 by first making a number of strips of wood A A A of ornamental configuration. The strips I prepare from a plank or board by first crosscutting the surface of said plank and then dividing the latter longitudinally.

In the edges of the strips or bars forming the grille are made grooves B. After the said grille is completed I place it upon any flat surface and pour melted metal into its openings or interstices and allow said metal to harden. Any metal may be employed the melting-point of which is not so high as to cause it to char the wood—such, for example, as Babbitt metal, solder, or any of the easily-fusible alloys. The panel is thus a solid slab produced of blocks C of metal separated by the wooden strips A. The metal is locked in the openings through its entering the grooves B, as shown in Fig. 3. The surface to be exposed is finally dressed off smooth, and, if desired, polished, lacquered, colored, plated, or otherwise finished. Although the panel is produced at low cost and with little labor, the decorative effect obtained is the same as that of intricate and expensive inlaid work.

I claim—

The combination, in a slab or panel of the type described, of a series of ornamental wooden strips A A A, halved together to produce a grille or lattice work and provided with grooves B, and metal blocks C, filling the interstices in said lattice-work and having ribs or projections entering said grooves.

ALLAN B. CAMERON.

Witnesses:
ADDISON CANDOR,
HUGH GILMORE.